United States Patent
Seki et al.

(10) Patent No.: US 6,896,404 B2
(45) Date of Patent: May 24, 2005

(54) METHOD AND DEVICE FOR CONTROLLING THE TEMPERATURE OF AN OBJECT USING HEAT TRANSFER FLUID

(75) Inventors: Masanobu Seki, Kanagawa (JP); Jun Sasaki, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 4 days.

(21) Appl. No.: 10/326,383

(22) Filed: Dec. 23, 2002

(65) Prior Publication Data

US 2003/0118074 A1 Jun. 26, 2003

(30) Foreign Application Priority Data

Dec. 26, 2001 (JP) ........................................ 2001-394832
Dec. 26, 2001 (JP) ........................................ 2001-394942

(51) Int. Cl.$^7$ ........................... G01K 17/00; F25D 17/00
(52) U.S. Cl. ............................. 374/29; 62/180; 62/201
(58) Field of Search ............................. 62/3–7, 3.2, 3.3, 62/180, 201, 430, 434, 238.1; 165/104.33, 80.2

(56) References Cited

U.S. PATENT DOCUMENTS 5,613,364 A    3/1997 Higgins
5,871,526 A  * 2/1999 Gibbs et al. ................ 607/104

FOREIGN PATENT DOCUMENTS

JP          04213103 A  *  8/1992  .......... G05D/23/00

* cited by examiner

Primary Examiner—Chen Weng Jiang
(74) Attorney, Agent, or Firm—Westerman, Hattori, Daniels and Adrian LLP

(57) ABSTRACT

An object of the present invention is to suppress to a sufficiently small level variation in the temperature of an object in a case where the temperature of an object is controlled to a desired value using heat transfer fluid. A controller (9) controls the power of a thermoelectric conversion device (6) which is used for cooling or heating heat transfer fluid supplied to an object (5). The controller (9) performs a feedback control operation using the temperature (T1) of the heat transfer fluid emitted from the thermoelectric conversion device (6) and the temperature (Ts) of the object. In this feedback control operation, the difference between the object temperature (Ts) and the heating medium temperature (T1) is added to a set temperature (SV), whereby a target temperature of the heating medium temperature (T1) is calculated. By means of an I-PD calculation with respect to the deviation between this target temperature and the heating medium temperature (T1), a manipulated variable to be applied to the cooler/heater (6) is calculated. Prior to the beginning of this feedback control operation, an initial value of the aforementioned manipulated variable is calculated in accordance with the magnitude of a thermal load to be applied to the object (5) from outside during the control operation and the set temperature (SV). The feedback control operation begins upon the output of this initial value.

15 Claims, 11 Drawing Sheets

METHOD AND DEVICE FOR CONTROLLING THE TEMPERATURE OF AN OBJECT USING HEAT TRANSFER FLUID

BACKGROUND OF THE INVENTION

1. Field of the Invention

The present invention relates to a method and device for controlling the temperature of an object using heat transfer fluid.

2. Description of the Related Art

Temperature-controlled heat transfer fluid is used in a processing chamber for processing a semiconductor wafer in a plasma atmosphere in order to control the temperature of a table on which the semiconductor wafer is placed (to be referred to hereafter as "susceptor"). The heat transfer fluid is brought to an appropriate temperature using a temperature adjusting device (for example a chiller for cooling high-temperature heat transfer fluid returned from a chamber) which is disposed in a location removed from the chamber, and then transferred from the device to the chamber and circulated around the susceptor. The heat transfer fluid is then removed from the chamber and returned to the temperature adjusting device.

As is illustrated in FIG. 1, this type of temperature adjusting device conventionally measures the temperature T1 of heat transfer fluid newly discharged from the device and controls the amount of heating or cooling to be performed on the heat transfer fluid such that the measured discharge temperature T1 thereof reaches a set temperature SV.

According to this conventional method of controlling the discharge temperature of heat transfer fluid to a set temperature, it is difficult to suppress a large rise in the temperature of the susceptor when a thermal load (disturbance) is applied to the susceptor at the beginning of plasma processing in the processing chamber. To explain in more general terms, when controlling the discharge temperature of heat transfer fluid, it is difficult to sufficiently suppress temperature variation in the object of temperature control when a thermal load is applied to this object.

Also according to such discharge temperature control, the temperature of an object of temperature control such as a susceptor may vary greatly due to the effects of heat loss or heat resistance, or due to wasted time, delays and the like, in the piping or chambers existing on the outside of the temperature controlling device.

A well-known method also exists in which a control operation is performed such that the temperature of the object of temperature control itself is detected and controlled to a set temperature. However, since the temperature of the object of temperature control is controlled indirectly via the heat transfer fluid, it is difficult to reduce temperature variation in the object of temperature control when the control operation is performed based only on the temperature of the object of temperature control itself.

SUMMARY OF THE INVENTION

It is therefore an object of the present invention to enable variation in the temperature of an object of temperature control to be sufficiently suppressed in a device for controlling the temperature of an object of temperature control using heat transfer fluid.

A device for controlling the temperature of an object according to one aspect of the present invention comprises a cooler/heater which uses a thermoelectric conversion device to cool or heat heat transfer fluid which is supplied to an object, an object temperature sensor for detecting the current temperature of the object, and a controller for outputting a manipulated variable relating to the cooler/heater by performing a feedback control operation using the current object temperature from the object temperature sensor. The controller is designed to control the temperature of the heat transfer fluid in the feedback control operation such that the object temperature is controlled to a desired temperature.

A device for controlling the temperature of an object using heat transfer fluid according to another aspect of the present invention comprises a cooler/heater for cooling or heating heat transfer fluid which is supplied to an object, a heating medium temperature sensor for detecting the current temperature of the heat transfer fluid, an object temperature sensor for detecting the current temperature of the object, and a controller for outputting a manipulated variable in relation to the cooler/heater by performing a feedback control operation using the current heating medium temperature from the heating medium temperature sensor and the current object temperature from the object temperature sensor. In the feedback control operation, the controller determines a target temperature for the heating medium temperature so as to control the object temperature to the desired temperature, and determines the aforementioned manipulated variable so as to control the heating medium temperature to the determined target temperature.

According to this temperature controlling device, not only the temperature of the heat transfer fluid, but also the temperature of the object is detected, and both temperatures are used to control the temperature of the heat transfer fluid. As a result, variation in the temperature of the object can be suppressed to a large extent, whereby the temperature can be controlled with a greater degree of constancy.

In a preferred embodiment, the cooler/heater cools or heats the heat transfer fluid using a thermoelectric conversion device. By using a thermoelectric conversion device, the cooler/heater can be reduced in size, and the distance between the cooler/heater and the object can be reduced, thereby enabling a reduction in the volume of heat transfer fluid. Further, the responsiveness and temperature control precision of the thermoelectric conversion device itself are high, resulting in the attainment of high controllability.

In a preferred embodiment, the controller, prior to beginning the feedback control operation, holds a numerical value relating to the magnitude of the thermal load to be applied to the object from outside during the feedback control operation, determines an initial value of the manipulated variable in accordance with the magnitude of the thermal load using this held numerical value, and when the feedback control operation begins, initially outputs the determined initial value.

In so doing, control which is appropriate to the magnitude of the thermal load can be performed, and this control can be applied to various control systems in which different thermal loads are applied to objects.

In a preferred embodiment, the controller, prior to the beginning of the feedback control operation, inputs an idling value relating to a magnitude of the manipulated variable necessary for stabilizing and maintaining the object temperature at the desired temperature when no thermal load is applied to the object from outside, and when determining the initial value, uses not only the magnitude of the thermal load, but also this idling value to adjust the initial value.

If the various conditions of a control system, such as the thermal capacity or thermal conductivity of each component, are different, then the aforementioned idling value will also differ. By adjusting the initial value using an idling value determined in advance, as described above, the invention can be applied to various control systems with differing conditions.

In a preferred embodiment, the controller calculates the current difference in temperature between the object temperature and the heating medium temperature in the feedback control operation, and uses this calculated current temperature difference to dynamically correct the desired temperature, thereby determining a target temperature for the heating medium temperature.

A further device for controlling the temperature of an object using heat transfer fluid according to an aspect of the present invention different to those described above comprises a cooler/heater for cooling or heating heat transfer fluid which is supplied to an object, a heating medium temperature sensor for detecting the current temperature of the heat transfer fluid, an object temperature sensor for detecting the current temperature of the object, and a controller for inputting the current heating medium temperature from the heating medium temperature sensor and the current object temperature from the object temperature sensor, and outputting a manipulated variable relating to the cooler/heater. The controller comprises follow-up control means which, prior to the application of a thermal load to the object from outside, determine a fixed target temperature on the basis of a set temperature and the temperature difference between the heating medium temperature and the object temperature detected during a steady state, and then perform a follow-up control operation such that the current heating medium temperature is controlled to the determined fixed target temperature, and variable value control means which, when a thermal load is applied to the object from outside, determine a current target temperature dynamically on the basis of the set temperature and the temperature difference between the current heating medium temperature and the current object temperature, and then perform a variable value control operation such that the current heating medium temperature is controlled to the determined current target temperature.

According to this temperature controlling device, variation in the temperature of an object can be suppressed to a large extent, whereby the temperature can be controlled to a set temperature.

In a preferred embodiment, the follow-up control means first perform a first control operation so as to control the current heating medium temperature to the set temperature, and when as a result of the first follow-up control operation a steady state is established in which the heating medium temperature is stabilized to the set temperature, perform a second control operation in which the temperature difference between the heating medium temperature and the object temperature is calculated, the fixed target temperature is determined using the temperature difference calculated in the steady state and the set temperature, whereupon the current heating medium temperature is controlled to the fixed target temperature.

In a preferred embodiment, the variable value control means, prior to the beginning of the variable value control operation, set a numerical value relating to the magnitude of the thermal load to be applied to the object from outside during the variable value control operation, determine an initial value of the manipulated variable in accordance with the magnitude of the thermal load using this set numerical value, and at the beginning of the variable value control operation, initially output the determined initial value.

In a preferred embodiment, the variable value control means, prior to the beginning of the variable value control operation, hold a value relating to the magnitude of the manipulated variable at the time of establishment of the steady state by means of the second control operation performed by the follow-up control means, and when determining the initial value, use not only the magnitude of the thermal load, but also the held value to adjust the initial value.

DESCRIPTION OF THE PREFERRED EMBODIMENTS

An embodiment of the present invention will be described below. The following embodiment is an example of a case in which the present invention is implemented in an application in which the temperature of a susceptor used for supporting a semiconductor wafer inside a processing chamber for processing a semiconductor wafer in a plasma atmosphere is controlled to a constant level. However, the scope of the present invention is not limited to this example, and the present invention may be implemented in various other applications.

Figure 1:
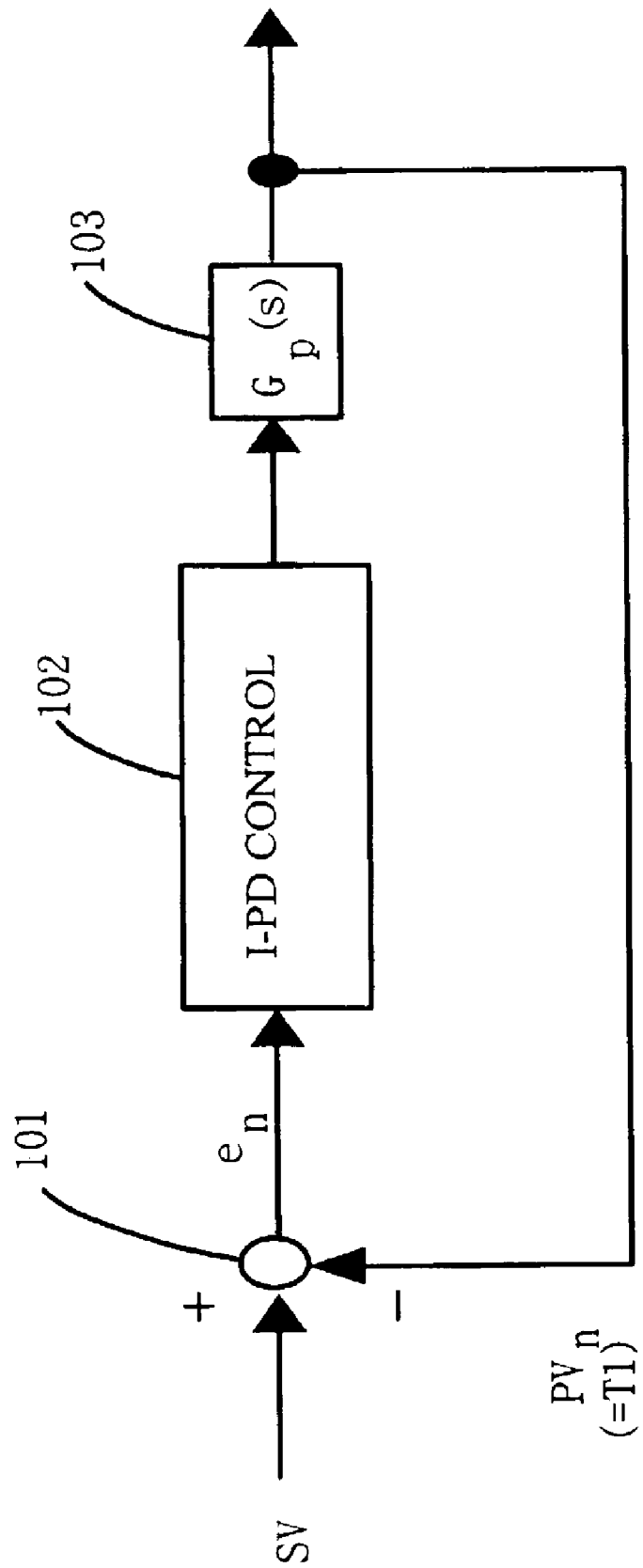
FIG. 1 is a block diagram illustrating a conventional method of control based only on discharge temperature T1.
Figure 2:
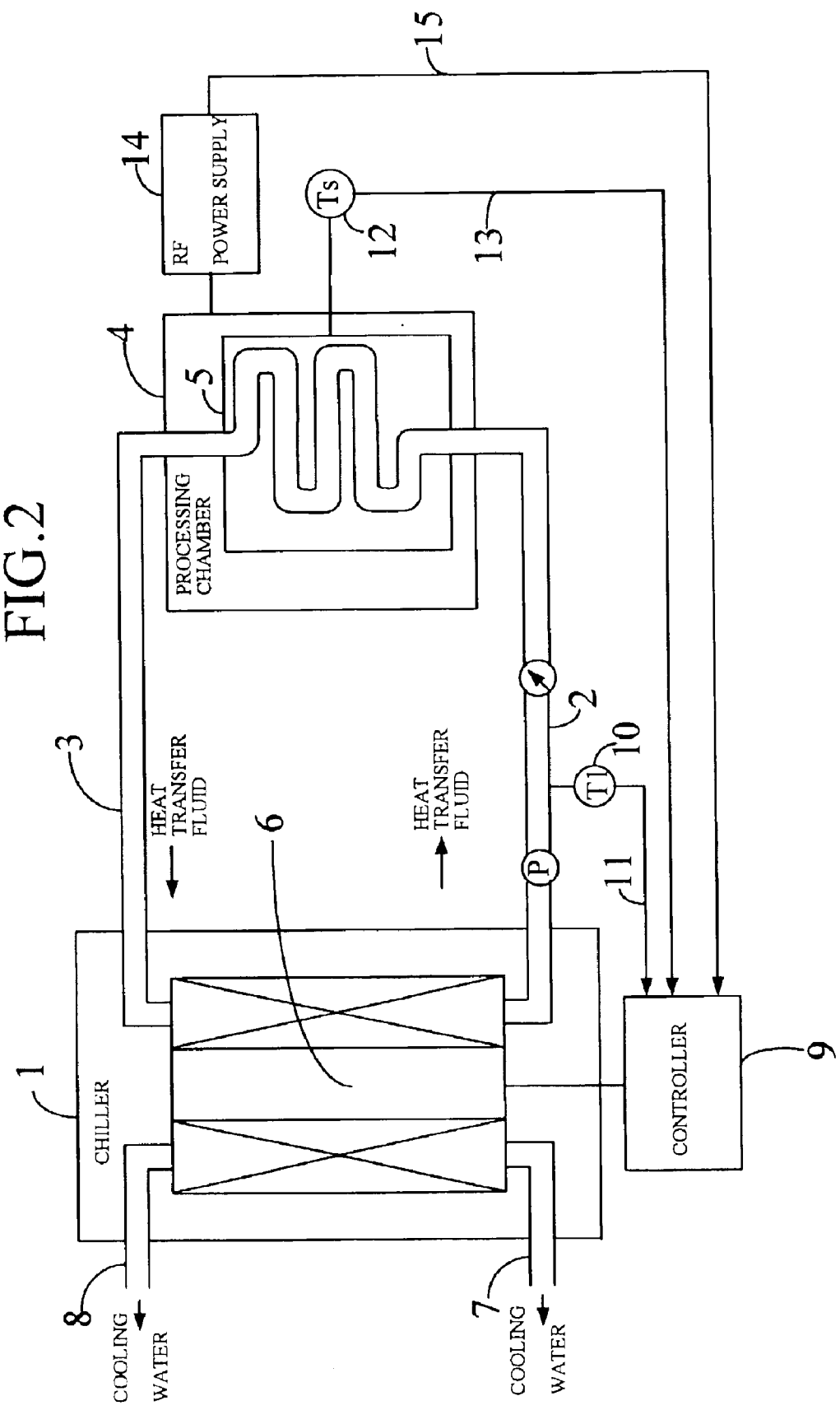
FIG. 2 is a block diagram illustrating the overall constitution of an embodiment of the present invention.

FIG. 2 shows the overall constitution of this embodiment.

A chiller 1 for cooling heat transfer fluid is disposed in a location removed from a processing chamber 4 by one to several meters, for example. Heat transfer fluid which has been temperature controlled by the chiller 1 is discharged from the chiller 1 and supplied to the processing chamber 4 through piping 2. For example, water, ethylene glycol, Fluorinert (registered trademark), and so on may be used as the heat transfer fluid. The heat transfer fluid which enters the processing chamber 4 controls the temperature of a susceptor 5 by circulating through the interior of the susceptor 5. When a semiconductor wafer placed on the susceptor 5 in the processing chamber 4 is processed, plasma is generated and heat from this plasma is applied to the susceptor 5. At this time, the heat transfer fluid cools the susceptor 5 by absorbing the heat therefrom. As a result, the heat transfer fluid rises in temperature and is emitted from the processing chamber 4. This high-temperature heat transfer fluid is returned to the chiller 1 through the piping 3.

A cooler 6 installed in the chiller 1 cools the returned high-temperature heat transfer fluid. A thermoelectric conversion device which serves as a heat pump utilizing the semiconductor Peltier effect, for example, maybe (but does not necessarily have to be) used as the cooler 6. This thermoelectric conversion device is constituted from a large number of pairs of n-type semiconductor chips and p-type semiconductor chips which are electrically connected in π configurations. This thermoelectric conversion device is a plate-form device in which this multitude of semiconductor chip pairs are electrically directly connected and arranged on a two-dimensional plane, and operates such that when an electrical current is passed therethrough, heat is absorbed on the main surface of one side, whereas heat is released on the main surface of the opposing side. If the orientation of the current which is passed through the thermoelectric conversion device is reversed, the directions in which heat moves in the thermoelectric conversion device also reverse.

The cooler 6 absorbs heat from the heat transfer fluid flowing from the piping 3 to the piping 2 on the main surface of one side of this plate-form thermoelectric conversion device, and releases heat into the cooling water which is flowing from the piping 7 out to the piping 8 on the main surface of the opposite side.

When the cooler 6 is constructed using a thermoelectric conversion device such as that described above, the size of the chiller 1 can be considerably reduced in comparison with a typical cooler 6 constructed by a cooling medium circuit having a compressor, and the distance between the chiller 1 and the processing chamber 4 can be reduced, thereby enabling a reduction in the volume of heat transfer fluid. Moreover, the speed of response and temperature control precision of the cooler 6 itself are improved, as a result of which improved control performance can be achieved.

A controller 9 is attached to the chiller 1, and mainly serves to control the cooling ability of the cooler 6 by controlling the current which flows through the thermoelectric conversion device of the cooler 6 such that the temperature of the heat transfer fluid emitted from the cooler 6 can be controlled to an appropriate value. The controller 9 inputs a detection signal 11 indicating the current temperature (discharge temperature) T1 of the heat transfer fluid when discharged from the chiller 1 which is outputted from a discharge temperature sensor 10 disposed in the vicinity of the heat transfer fluid discharge port of the chiller 1. The controller 9 also inputs a detection signal 13 indicating the current susceptor temperature Ts which is outputted from a susceptor temperature sensor 12 for detecting the temperature of the susceptor inside the processing chamber 4. Furthermore, a radiofrequency (RF) power supply device 14 for generating radiofrequency plasma inside the processing chamber 4 outputs an ON/OFF signal of the main switch thereof, a driving signal 15 indicating the output power level thereof, and so on, which are also inputted by the controller 9. The controller 9 performs the control operation to be described below on the basis of this input. The controller 9 is constituted by a programmed computer, for example.

Figure 3:
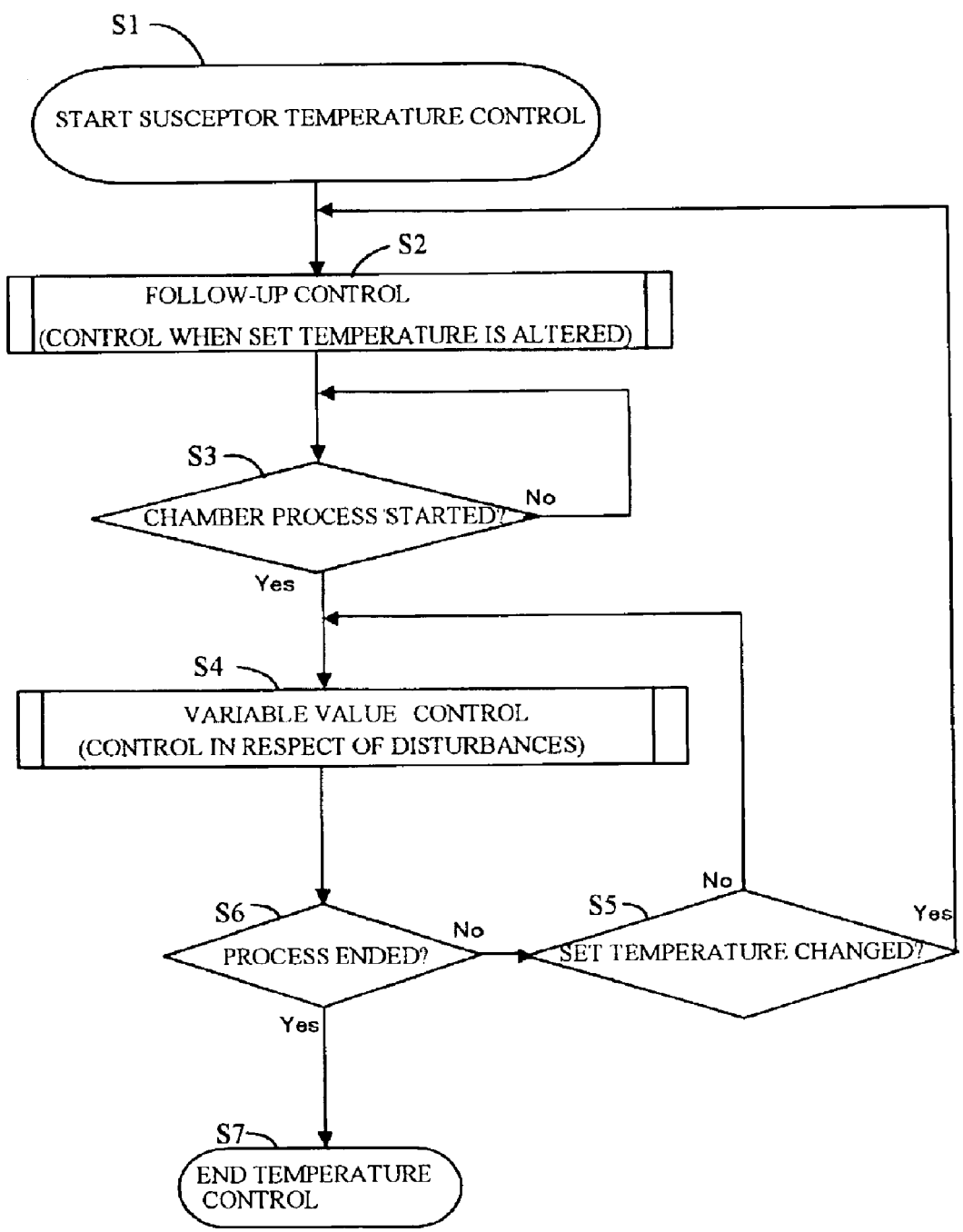
FIG. 3 is a flowchart illustrating the flow of an overall control operation performed by a controller 9.

FIG. 3 shows the flow of the overall control operation performed by the controller 9.

As is illustrated in FIG. 3, the controller 9 begins the control operation in step S1, but at this initial point in time, the main switch of the RF power supply device 14 in the processing chamber 4 is OFF, and the process in the chamber 4 has not yet begun (this will be referred to as "in an idling state " hereafter). First, in this initial idling state, the controller 9 performs follow-up control in step S2 to modify a set temperature SV (S2) As a result of this follow-up control, a steady state is established in which the susceptor temperature Ts is stabilized at the set temperature SV. Thereafter, the controller 9 awaits the beginning of the process in the processing chamber 4 while maintaining this constant state (S3). When the chamber process begins (for example when the main switch ON/OFF signal of the RF power supply device 14 indicates ON) (YES in step S3), the controller 9 moves to step S4 and begins variable value control, thereby operating so as to control the susceptor temperature Ts to a constant level by subjugating disturbances such as thermal loads caused by the generation of plasma inside the chamber 4.

In the chamber process, the following operations are repeatedly executed a large number of times, each time serving as one cycle. At the beginning of the operations of one cycle, the output power level of the RF power supply device 14 is substantially zero, and therefore no plasma is generated (this will be referred to hereafter as the "RF-OFF state") In this RF-OFF state, a new semiconductor wafer is inserted into the processing chamber 4 and placed on the susceptor 5. Next, the output power level of the RF power supply device 14 is raised to a predetermined wattage value such that plasma is generated inside the processing chamber 4 (this will be referred to hereafter as the "RF-ON state"). Thereby, predetermined processes are performed on the semiconductor wafer inside the chamber 4. This RF-ON state continues for a fixed period of time, whereupon the state inside the chamber 4 is switched back to the RF-OFF state and the processed semiconductor wafer is transported outside from the processing chamber 4. Thus end the operations of one cycle. The operations in this one cycle are executed repeatedly. During one chamber process, the operations described above are repeated many times, and thus a multitude of semiconductor wafers are processed sequentially in the chamber 4.

As this chamber process continues, the controller 9 continually performs the variable value control of step S4. If the set temperature SV is changed at a point in the process (at which point the chamber process temporarily ends) (YES in step S5), then the controller 9 halts variable value control, returns to step S2, and starts the control process again from the aforementioned follow-up control. When the chamber process restarts thereafter, variable value control is performed again.

When this chamber process ends (for example when the ON/OFF signal of the main switch of the RF power supply device 14 indicates that the switch is turned off) (YES in step S6), the controller 9 ends the control operation (S7).

Figure 4:
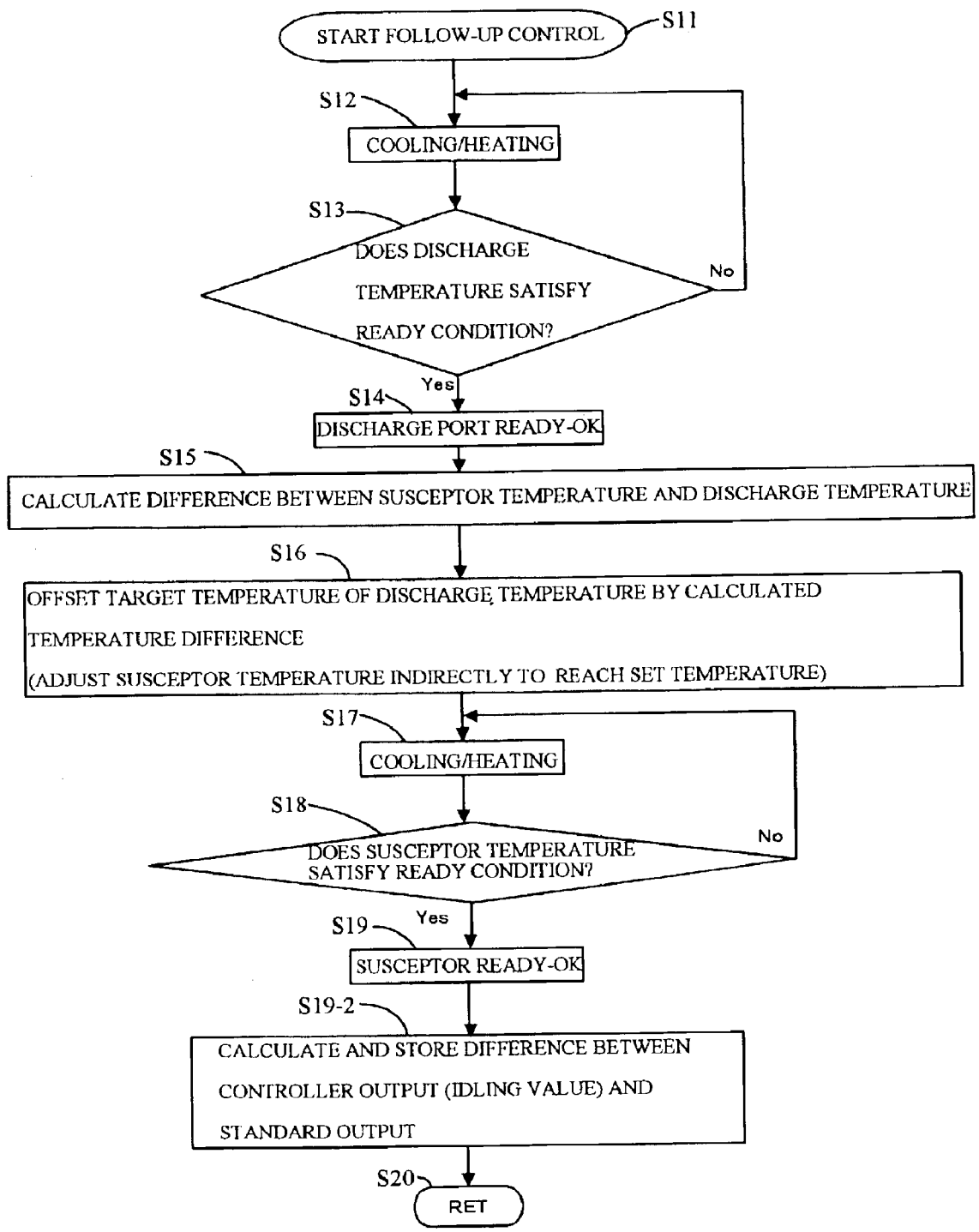
FIG. 4 is a flowchart illustrating the flow of follow-up control within FIG. 3.
Figure 5:
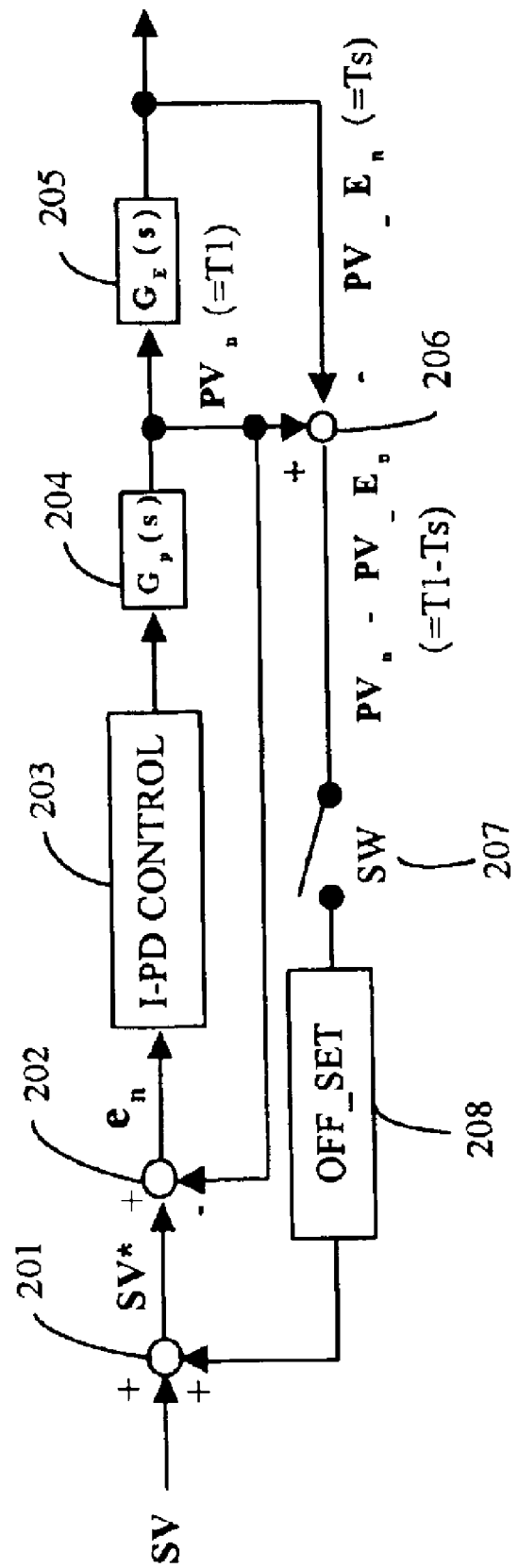
FIG. 5 is a block diagram illustrating a constitution for performing feedback temperature control used in this embodiment.
Figure 6:
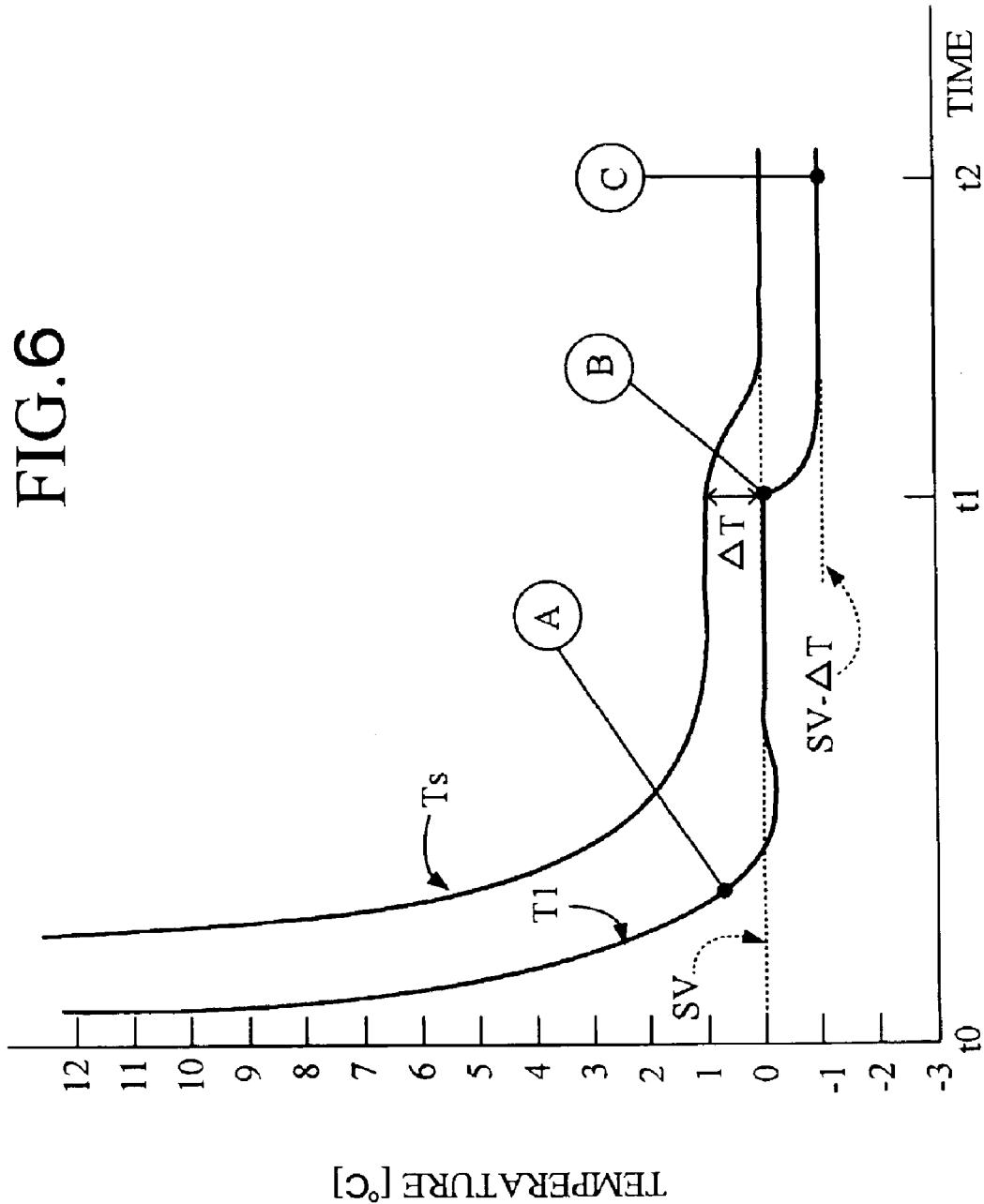
FIG. 6 is a view illustrating an example of a variation curve of the discharge temperature T1 and susceptor temperature Ts resulting from the follow-up control of FIG. 4.

FIG. 4 shows in further detail the follow-up control procedure of step S2, which is performed during the initial idling state. FIG. 5 shows a control block diagram of the feedback temperature control performed within this follow-up control (the feedback temperature control performed within the variable value control to be described below is also performed using the functions of this block diagram). FIG. 6 shows an example of a variation curve of the discharge temperature T1 and the susceptor temperature Ts in accordance with this follow-up control (note that the temperature scale on the ordinate indicates a relative temperature where the set temperature SV is set at 0° C.).

As is illustrated in FIG. 4, when follow-up control begins (S11), the controller 9 first performs feedback temperature control (discharge temperature control) based only on the discharge temperature T1 (S12). This discharge temperature control is performed in a state in which a switch 207 shown in the block diagram in FIG. 5 is open, and an offset value outputted from an offset portion 208 is initially set to zero. The blocks 201 to 203 and 206 to 208 in the drawing are calculation processes performed by the controller 9, whereas block 204 is a transfer function of the cooler 6 and block 205 is a transfer function of the susceptor 5. The suffix n attached to the variables in FIG. 5 indicates the number of times sampling has been performed during digitization of the control calculations. However, an analog controller may of course also be used to perform continuous-time calculations in place of a digital controller which performs such discrete-time sampling. In this embodiment, I-PD control, as is shown in block 203 in FIG. 5, is used as the method of feedback temperature control. Note, however, that I-PD control is merely an example for the purposes of explanation, and another control method may be used.

In this discharge temperature control, as is illustrated in FIG. 5, the controller 9 determines the deviation e between the detected discharge temperature T1 and the set temperature SV which is the target discharge temperature (the offset value is zero, and therefore SV=SV*) (202, 202). I-PD calculation is then performed in respect of this deviation e (203), whereupon the power of the thermoelectric conversion device of the cooler 6 (204) is operated in accordance with the result of this calculation. Thereby, the discharge temperature T1 is controlled so as to substantially match the set temperature SV, as is shown in zone A from time t0 to t1 (seconds) in FIG. 6. Meanwhile, although the susceptor temperature Ts varies in conformity with the discharge temperature T1, there still remains a slight temperature difference therebetween, and thus the discharge temperature T1 does not match the set temperature SV.

Returning to FIG. 4, when the discharge temperature T1 satisfies a predetermined ready condition (for example stabilizing to within a range in the vicinity of the set temperature SV and remaining there over a predetermined time period) (YES in S13) as a result of the aforementioned discharge temperature control of step S12, the controller 9 judges the discharge temperature T1 to be in a steady state (S14). This judgment is made at a time B (t1), for example, in FIG. 6. At the time B at which this judgment is made, the controller 9 calculates the temperature difference −ΔT (=T1−Ts) between the susceptor temperature Ts in this steady state and the discharge temperature T1 (S15). The controller 9 then adds this temperature difference −ΔT as an offset value to the set temperature SV. Then, from time B onward, this additional value (=SV−ΔT) is used as a new target temperature SV* of the discharge temperature T1 (S16) to execute the I-PD control of FIG. 4 once again (S17) To describe the operations in these steps S15 through S17 using the block diagram in FIG. 5, first, at time B, the switch 207 is closed whereby the temperature difference −ΔT (=T1−Ts) at time B is inputted into and stored in the offset portion 208. The switch 207 is then immediately opened and, with the switch 207 remaining open thereafter, the offset value −ΔT at time B which is stored in the offset portion 208 is added to the set temperature SV to produce the target temperature SV*, whereupon the discharge temperature T1 is I-PD controlled to match this target temperature SV*. This control operation means indirectly controlling the susceptor temperature Ts so as to reach the set temperature SV. In so doing, the susceptor temperature Ts is controlled to the set temperature SV as is shown from time B onward in the curve in FIG. 6.

Returning to FIG. 4, when the susceptor temperature Ts has satisfied a predetermined ready condition (for example stabilizing to within a range in the vicinity of the set temperature SV and remaining there over a predetermined time period) by means of the aforementioned discharge temperature control in step S17 (YES in S18), the controller 9 judges that the susceptor temperature Ts is in a steady state (S19) This judgement is made at a time C (t2), for example, shown in FIG. 6.

After making this judgment, the controller 9 calculates the difference between the output value of the controller 9 in this steady state (the manipulated variable applied to the cooler 6, to be referred to hereafter as "idling value") and a predetermined standard output value, and stores the calculated output difference (S19-2). This standard output value indicates an output value which is outputted from the controller 9 when the susceptor temperature Ts is in a steady state in cases when the aforementioned discharge temperature control is implemented under standard control system conditions (the cooling water temperature, ambient temperature, the various characteristics of the constituent elements of the control system such as the cooler 6, the piping 2, 3, the susceptor 5, and so on, etc.) which are premised upon the design of the controller 9. This standard output value is a correct value only under these standard control system conditions. Accordingly, the difference between the idling value and the standard output value calculated in step S19-2 indicates the amount of excess or deficiency in the output value of the controller 9 under the actual control system conditions. This amount of excess or deficiency is stored and then used in the subsequent variable value control to correct excess or deficiency in the output value from the controller 9.

Next, in step S20, the controller 9 moves the control process to step S3 in FIG. 3 and awaits the beginning of the process in the processing chamber 4 (while waiting, the discharge temperature control of step S17 in FIG. 4 continues).

Note that if the temperature difference detected in step S15 becomes inappropriate during the flow of the aforementioned follow-up control of FIG. 4, or becomes inappropriate following detection due to outside disturbances such that the set temperature SV cannot be stabilized, the susceptor temperature Ts is checked from time to time (for example at 30 second intervals) during subsequent discharge temperature control operations in step S17 while making minute adjustments to the target temperature of the discharge temperature T1. These minute adjustments to the target temperature continue until the susceptor temperature Ts is stabilized to the set temperature SV.

As has already been explained with reference to FIG. 3, when the aforementioned follow-up control is complete, the controller 9 judges that the process in the processing chamber 4 has begun (YES in S3) in response to the main switch of the RF power supply device 14 being turned ON, whereupon the variable value control of step S4 begins. This variable value control continues throughout the chamber process.

Figure 7:
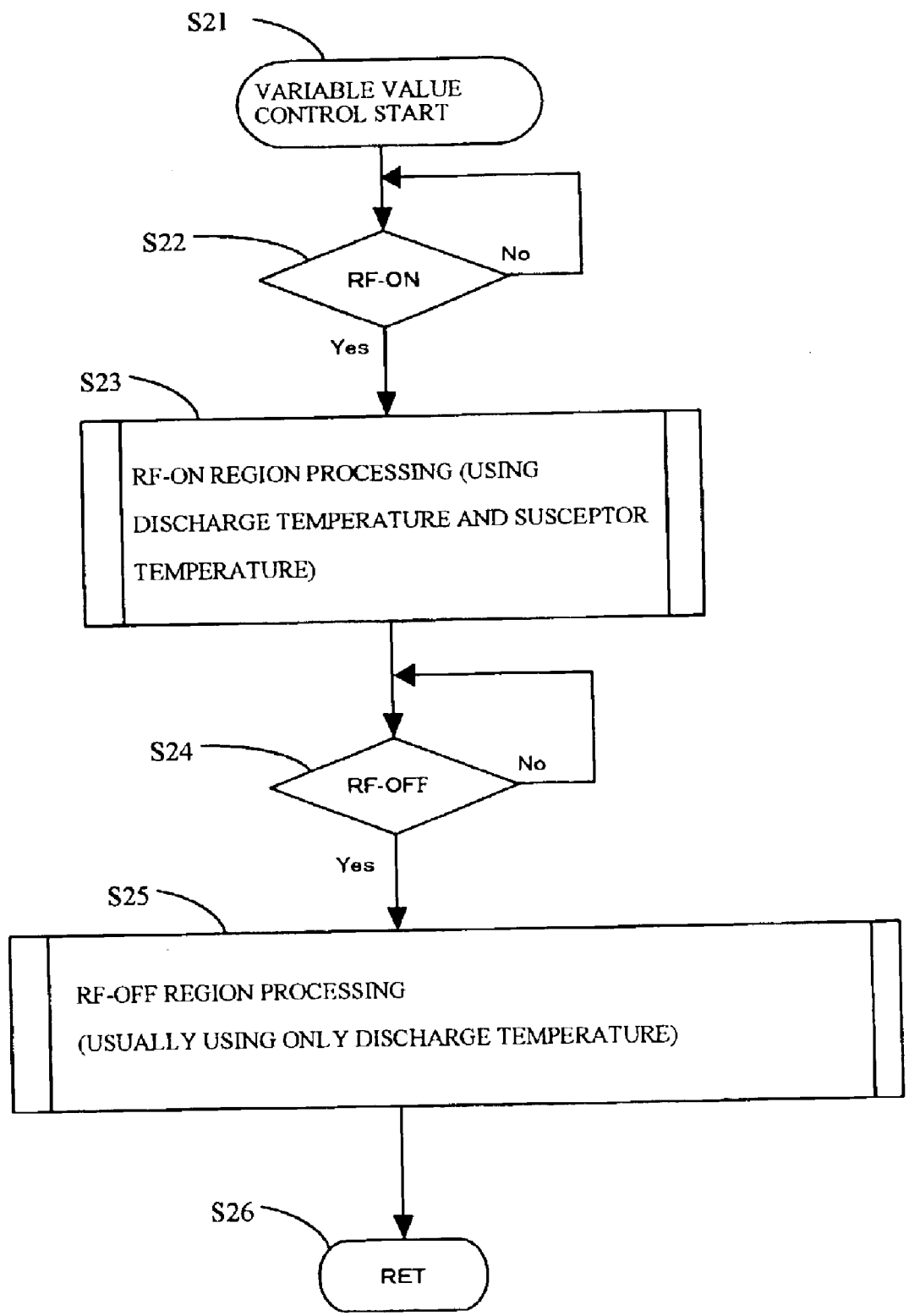
FIG. 7 is a flowchart illustrating the flow of variable value control within FIG. 3.
Figure 8:
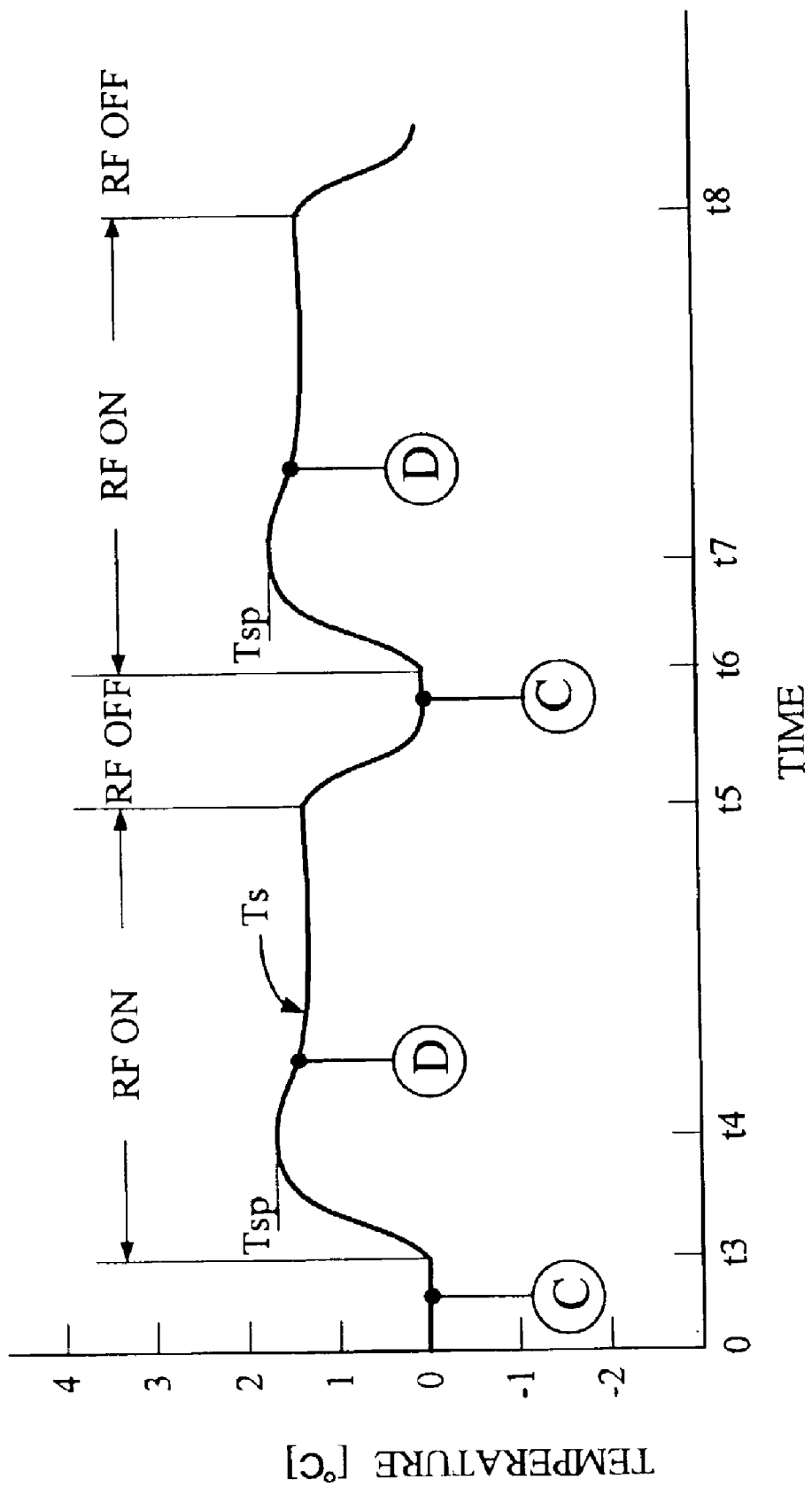
FIG. 8 is a view illustrating an example of a variation curve of the susceptor temperature Ts resulting from the variable value control of FIG. 7.

FIG. 7 illustrates in further detail the flow of the variable value control executed during the chamber process. The aforementioned control function of FIG. 5 is also used in the feedback temperature control performed during this variable value control. FIG. 8 illustrates an example of a variation curve of the susceptor temperature Ts in accordance with variable value control (note that the temperature scale indicates a relative temperature where the set temperature SV is set at 0° C.).

As is illustrated in FIG. 7, the controller 9 begins variable value control in response to the beginning of the chamber process (S21). At this point in time, the output power level of the RF power supply device 14 is substantially zero and the chamber is in an "RF-OFF" state. This initial RF-OFF state corresponds to section C on the left side of the curve in FIG. 8, where the temperature is zero (=SV). In this state, the controller 9 references the output power level of the RF power supply device 14 and waits for the chamber 4 to switch to an "RF-ON" state (S22). When the output power level of the RF power supply device 14 rises to a prescribed wattage value, thereby entering an RF-ON state (YES in S22) (time t3 in FIG. 8), the controller 9 begins the RF-ON region processing of step S23, continuing this RF-ON region processing for the duration of the RF-ON state (section D in FIG. 8). In this RF-ON region processing, as shall be described below, temperature control may be performed using, for example, both the discharge temperature T1 and the susceptor temperature Ts. Thereafter, when the chamber 4 returns to an RF-OFF state (YES in S24) (time t5 in FIG. 8), the controller begins the RF-OFF region processing of step S25, continuing this RF-OFF region processing for the duration of the RF-OFF state (the second section C in FIG. 8). In this RF-OFF region processing, as will be described below, discharge temperature control may be performed using usually, for example, only the discharge temperature T1, similarly to the follow-up control method illustrated in FIG. 4. Thereafter, the RF-ON region processing of step S23 and the RF-OFF region processing of step S25 are repeatedly executed in synchronization with the repeated RF-ON and RF-OFF states of the RF power supply device 14.

The RF-ON region processing of step S23 in FIG. 7 is performed with the switch 207 in the block diagram shown in FIG. 5 closed. This is, for example, I-PD control using both the discharge temperature T1 and the susceptor temperature Ts. In other words, as is illustrated in FIG. 5, the temperature difference between the current discharge temperature T1 and the current susceptor temperature Ts is added as an offset value to the set temperature SV (201), whereby this additional value becomes the current target temperature SV* for the discharge temperature T1. Since the temperature difference (offset value) between the current discharge temperature T1 and the current susceptor temperature Ts varies constantly, the target temperature SV* is occasionally altered in response thereto. Thus, the target temperature SV* is determined dynamically in accordance with the temperature difference between the current discharge temperature T1 and susceptor temperature Ts. The deviation e between this dynamic target temperature SV* and the current discharge temperature T1 is then calculated (202), whereupon I-PD calculation is performed in respect of this deviation e and the results of this calculation are applied to the cooler 6 as a manipulated variable (the output value of the controller 9).

The RF-OFF region processing of step S25 in FIG. 7, on the other hand, is performed with the switch 207 in the block diagram of FIG. 5 open, and with the offset value in the follow-up control steady state, pre-stored from the offset portion 208, outputted. This is similar to the I-PD control of step S16 in the follow-up control illustrated in FIG. 4.

The RF-ON region processing and RF-OFF region processing performed during variable value control will now be described in further detail.

Figure 9:
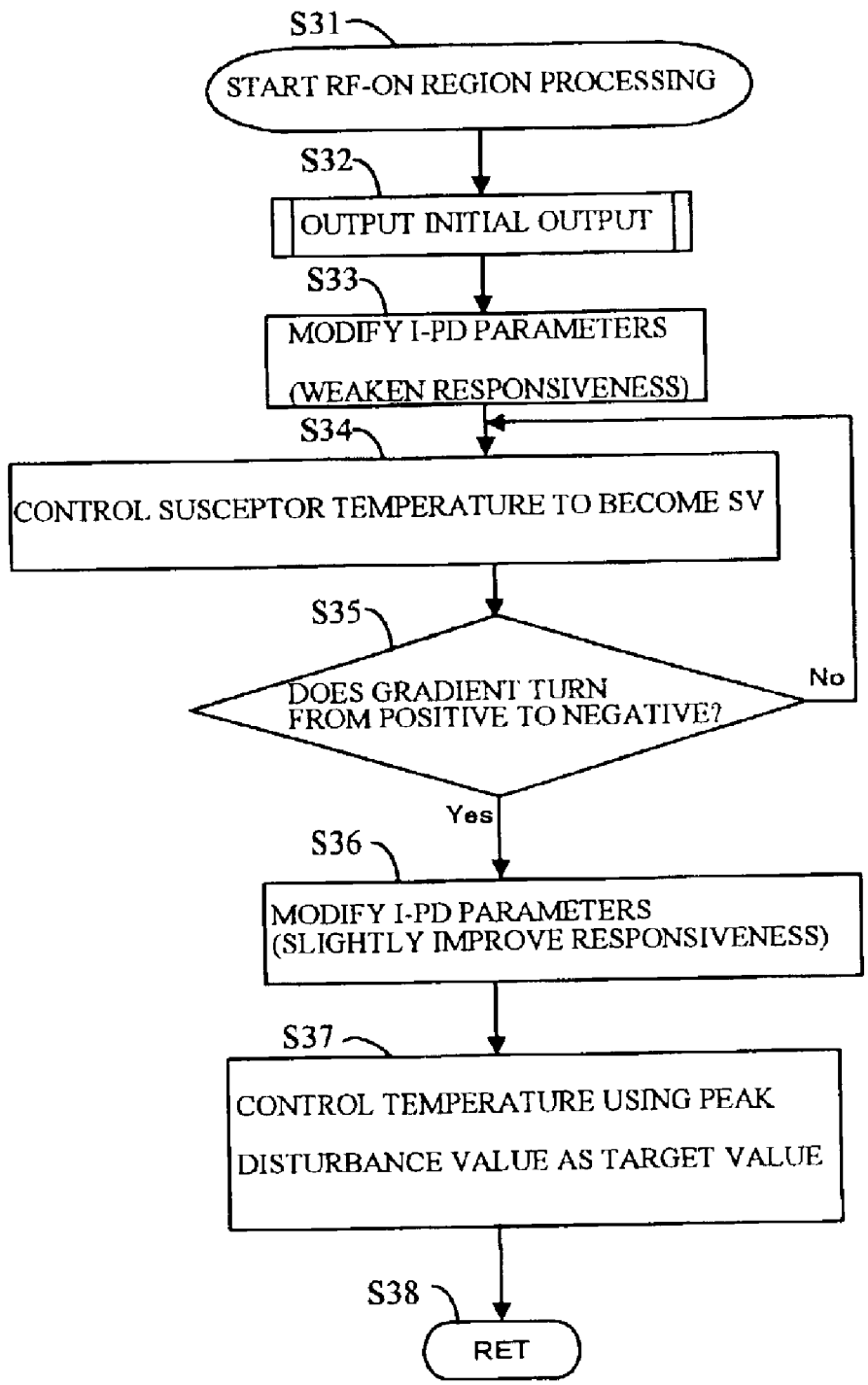
FIG. 9 is a flowchart illustrating the flow of RF-ON region processing within FIG. 7.
Figure 10:
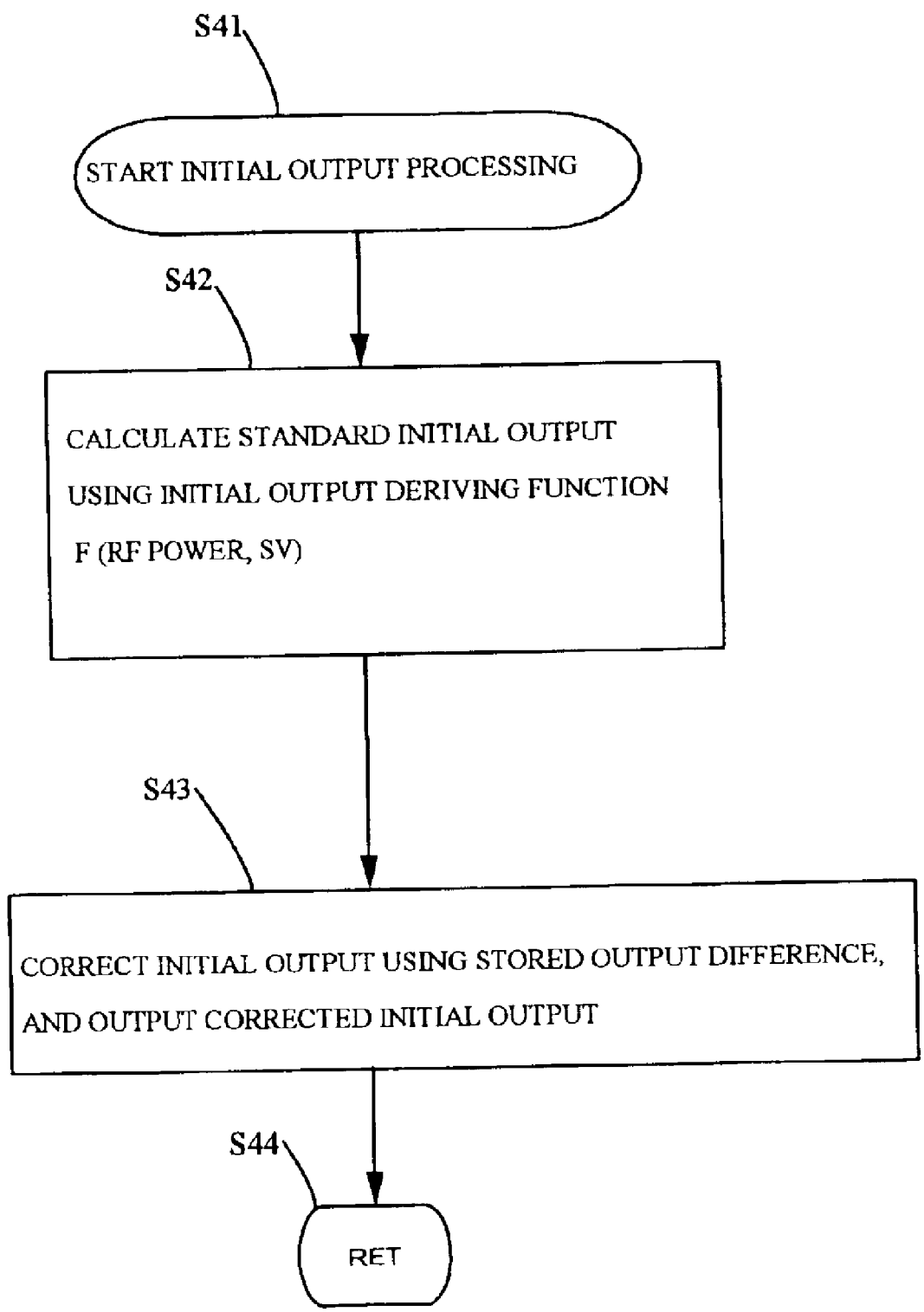
FIG. 10 is a flowchart illustrating the flow of processing for outputting an initial output within FIG. 9.

FIG. 9 shows the flow of RF-ON region processing in detail. FIG. 10 shows the flow of the initial output processing performed initially in this RF-ON region processing in detail.

As is illustrated in FIG. 9, at the beginning of RF-ON region processing (S31), the controller 9 determines and outputs an appropriate initial output conforming with the control system conditions, the set temperature SV, the magnitude of the thermal load caused by plasma generation, and so on, at that time (S32) In this initial output processing, as is illustrated in FIG. 10, the controller 9 first uses a predetermined initial output derived function F to calculate a standard initial output conforming to the output power level of the RF power supply device 14 (which corresponds to the magnitude of a thermal load to be applied to the susceptor 5 upon plasma generation) and the set temperature SV at that time (S42). Here, the initial output derived function F indicates an optimum initial output value (standard initial output being determined experientially in the design stage of the controller 9) in RF-ON region processing under the aforementioned standard control system conditions as a function in relation to the output power level of the RF power supply device 14 and the set temperature SV. This initial output derived function F is, for example, a linear function of the output power level of the RF power supply device 14, the gradient and intercept of this linear function each taking a linear polynomial form of the set temperature SV, and can be implemented in the controller 9 in forms such as a look-up table or a sub-routine. Having determined the standard initial output in this manner, the controller 9 then reads out the output difference between the idling value and the standard output stored in step S19-2 of the follow-up control of FIG. 4 and adds this output difference to the standard initial output so as to correct any excess or deficiency in the standard initial output. The controller 9 then outputs this corrected initial output value (S43). In this manner, the controller 9 outputs an appropriate initial output value conforming to the actual control system conditions.

Returning to FIG. 9, immediately after outputting the initial output, the controller 9 reduces the gain of the I-PD control slightly below the initial value (S33) such that the response of the I-PD control of block 203 in FIG. 5 becomes slightly sharper, and then closes the switch 207 shown in FIG. 5 so as to perform I-PD temperature control using both the discharge temperature T1 and the susceptor temperature Ts (S34). Since the susceptor 5 has poor thermal conductivity, a certain amount of time is necessary for the results of the initial output to appear in the susceptor temperature Ts, and therefore the I-PD control response is made slightly slower so that the susceptor 5 is not cooled excessively due to over-effective I-PD control during this delay.

Thereafter, as is illustrated in the sections t3 to t4 and t6 to t7 in FIG. 8, the susceptor temperature Ts rises slightly due to being disturbed by plasma generation. However, as the effects of the aforementioned I-PD control appear, the susceptor temperature Ts soon begins to fall. When the susceptor temperature Ts reaches its peak prior to falling (times t4, t7 in FIG. 8) (YES in S35), the controller 9 slightly increases the gain in the I-PD control (S36) so as to move the responsiveness of the I-PD control that was made slower in step S33 slightly back toward the initial value. The controller 9 then shifts the set temperature SV to the peak value of the disturbance in the susceptor temperature Ts (Tsp in FIG. 8) and continues the aforementioned I-PD temperature control using both the discharge temperature T1 and susceptor temperature Ts (S37). The reason the responsiveness of the I-PD control is moved slightly back toward the initial value here is that by raising the responsiveness, the set temperature SV is reached swiftly. The reason the set temperature SV is shifted to the peak value of the disturbance in the susceptor temperature Ts (Tsp in FIG. 8) is that it is preferable to maintain the already-risen susceptor temperature Ts fixed at the peak value than to cause it to return to the original set temperature SV in order to uniformly control the quality of a semiconductor wafer processed in the chamber 4. The control of step S37 is continued thereafter until the chamber 4 switches to an RF-OFF state.

When the chamber 4 switches to an RF-OFF state (at approximately 220 seconds and 470 seconds in FIG. 8), the controller 9 ends RF-ON region processing and begins RF-OFF region processing.

Figure 11:
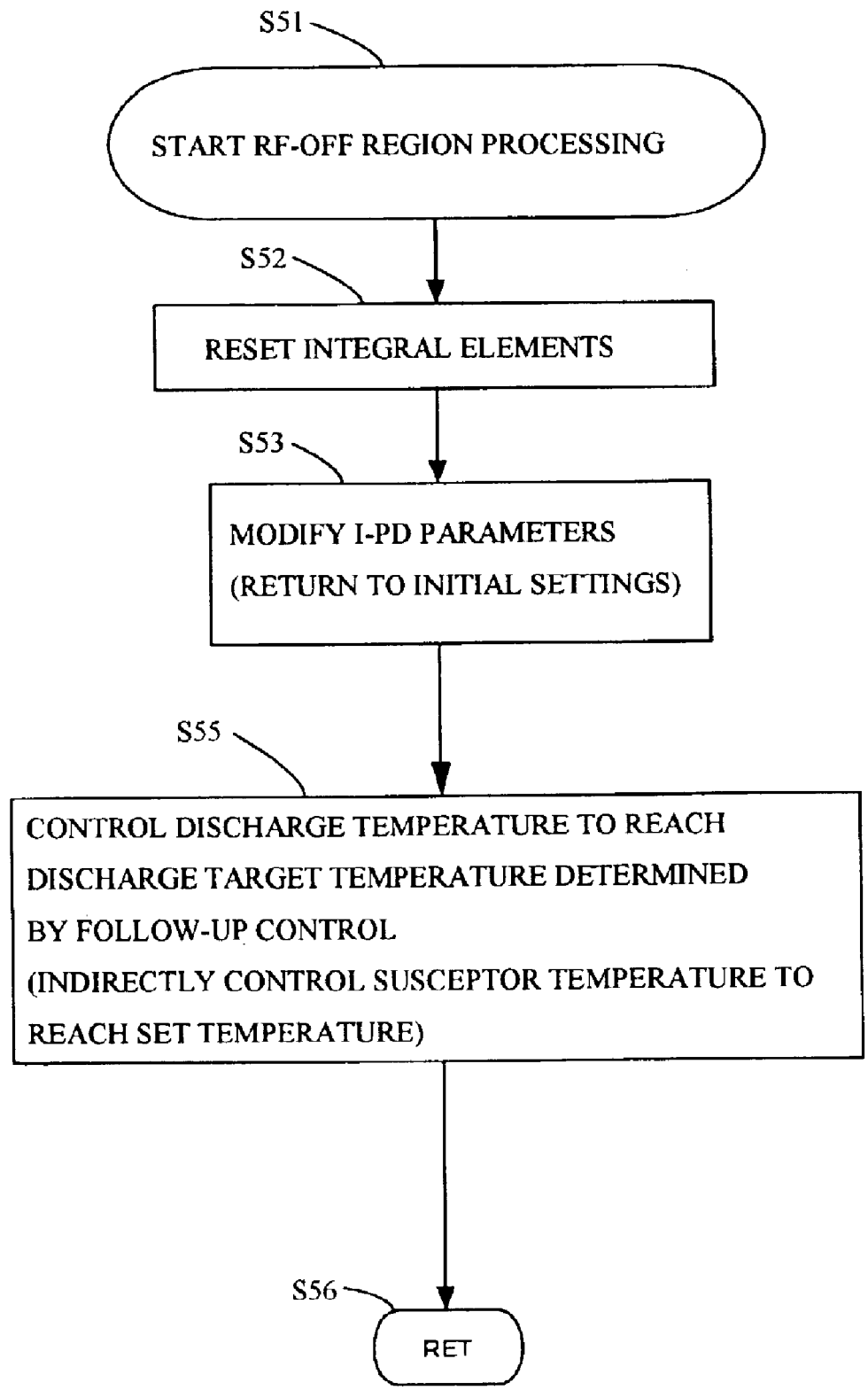
FIG. 11 is a flowchart illustrating the flow of RF-OFF region processing within FIG. 7.

FIG. 11 shows in detail the flow of RF-OFF region processing.

As is illustrated in FIG. 11, when the controller 9 begins RF-OFF region processing (S51), the integral (I) elements of the I-PD calculations accumulated in the RF-ON region processing are reset to zero (S52), whereupon the gain of the I-PD control which was reduced slightly below the initial value in the RF-ON region processing is returned to the initial value (S53). The controller 9 then indirectly controls the susceptor temperature Ts to the set temperature SV according to the same method as in step S16 of the follow-up control, again using the target temperature SV* (=SV−ΔT) of the discharge temperature T1 which was used in step S16 of the follow-up control performed prior to the beginning of the chamber process shown in FIG. 4.

RF-OFF region processing is continued until the chamber 4 returns to an RF-ON state.

By means of the control explained above, performed by the controller 9, fluctuation in the susceptor temperature Ts is suppressed to a larger degree than in the prior art, and thus favorable control results are achieved.

The embodiment of the present invention described above is an exemplification of the present invention for the purpose of explanation, and does not imply that the scope of the present invention is limited only to this embodiment. Accordingly, the present invention maybe implemented in various other embodiments without departing from the scope thereof.

For example, the principle of the present invention may be applied to a constitution in which the part which feeds back the discharge temperature T1 is removed from the constitution illustrated in FIG. 2 such that only the susceptor temperature Ts is fed back to the controller 9. In so doing, the temperature of the heat transfer fluid is controlled by controlling the power of the thermoelectric conversion device in accordance with the results of calculations performed by the controller 9 so as to directly control the susceptor temperature Ts to a target temperature.

What is claimed is:

1. A device for controlling the temperature of an object using heat transfer fluid, comprising:
    a cooler/heater (6) for cooling or heating heat transfer fluid which is supplied to an object (5);
    a heating medium temperature sensor (10) for detecting the current temperature of the heat transfer fluid;
    an object temperature sensor (12) for detecting the current temperature of the object (5); and
    a controller (9) for outputting a manipulated variable in respect of the cooler/heater (6) by performing a feedback control operation using the current heating medium temperature (T1) from the heating medium temperature sensor and the current object temperature (Ts) from the object temperature sensor,
    wherein in the feedback control operation, the controller (9) calculates the temperature difference (−ΔT) between the object temperature (Ts) and the heating medium temperature (T1), determines a target temperature to be the sum of the temperature difference (−ΔT) and the desired temperature (SV), and determines the manipulated variable so as to control the heating medium temperature (T1) to this determined target temperature.

2. The device according to claim 1, wherein the cooler/heater (6) cools or heats the heat transfer fluid using a thermoelectric conversion device.

3. The device according to claim 1, wherein the controller (9), prior to beginning the feedback control operation, inputs the magnitude of a thermal load to be applied to the object (5) from outside during the feedback control operation and an ON/OFF signal of the thermal load, determines an initial value of the manipulated variable in accordance with the magnitude of the inputted thermal load, and when beginning the feedback control operation, initially outputs the determined initial value.

4. The device according to claim 3, wherein the controller (9), prior to the beginning of the feedback control operation, holds a value relating to a magnitude of the manipulated variable necessary for stabilizing and maintaining the object temperature (Ts) at the desired temperature (SV) when no thermal load is applied to the object (5) from outside, and when determining the initial value, uses this held value to adjust the initial value.

5. A method for controlling the temperature of an object using heat transfer fluid, comprising the steps of:
    cooling or heating heat transfer fluid which is supplied to an object (5);
    detecting the current temperature of the heat transfer fluid;
    detecting the current temperature of the object (5); and
    controlling the amount by which the heat transfer fluid is cooled or heated by performing a feedback control operation using the detected current heating medium temperature (T1) and current object temperature (Ts),
    the controlling step comprising the steps of:
    determining a target temperature of the heating medium temperature (T1) so as to control the object temperature (Ts) to a desired temperature (SV);
    controlling the amount of heating or cooling so as to control the heating medium temperature (T1) to reach the determined target temperature; and
    calculating the temperature difference (−ΔT) between the object temperature (Ts) and the heating medium temperature (T1), and determining a target temperature to be the sum of the temperature difference (−ΔT) and the desired temperature (SV).

6. The device according to claim 5, wherein the controller (9), prior to beginning the feedback control operation, inputs the magnitude of a thermal load to be applied to the object (5) from outside during the feedback control operation and an ON/OFF signal of the thermal load, determines an initial value of the manipulated variable in accordance with the magnitude of the inputted thermal load, and when beginning the feedback control operation, initially outputs the determined initial value.

7. A device for controlling the temperature of an object using heat transfer fluid, comprising:
    a cooler/heater (6) for cooling or heating heat transfer fluid which is supplied to an object (5);
    a heating medium temperature sensor (10) for detecting the current temperature of the heat transfer fluid;
    an object temperature sensor (12) for detecting the current temperature of the object (5); and a controller (9) for inputting the current heating medium temperature (T1) from the heating medium temperature sensor and the current object temperature (Ts) from the object temperature sensor, and outputting a manipulated variable relating to the cooler/heater (6), the controller comprising:

follow-up control means which, prior to the application of a thermal load to the object (5) from outside, determine a fixed target temperature on the basis of a set temperature (SV) and the temperature difference between the heating medium temperature (T1) and the object temperature (Ts) detected during a steady state, and then perform a follow-up control operation such that the current heating medium temperature (T1) is controlled to the fixed target temperature thus determined; and variable value control means which, when a thermal load is applied to the object (5) from outside, dynamically determine a current target temperature on the basis of the set temperature (SV) and the temperature difference between the current heating medium temperature (T1) and the current object temperature (Ts), and then perform a variable value control operation such that the current heating medium temperature (T1) is controlled to the current target temperature thus determined.

8. The device according to claim 7, wherein the follow-up control means initially perform a first control operation so as to control the current heating medium temperature (T1) to the set temperature (SV), and when as a result of this first follow-up control operation a steady state is established in which the heating medium temperature (T1) is stabilized to the set temperature (SV), perform a second control operation in which the temperature difference between the heating medium temperature (T1) and the object temperature (Ts) is calculated, the fixed target temperature is determined using the calculated temperature difference in the steady state and the set temperature (SV), whereupon the current heating medium temperature (T1) is controlled to the fixed target temperature.

9. The device according to claim 7, wherein the variable value control means, prior to the beginning of the variable value control operation, set a numerical value relating to the magnitude of the thermal load to be applied to the object (5) from outside during the variable value control operation, determine an initial value of the manipulated variable in accordance with the magnitude of the thermal load using this set numerical value, and at the beginning of the variable value control operation, initially output the determined initial value.

10. The device according to claim 9, wherein the variable value control means, prior to the beginning of the variable value control operation, hold a value relating to the magnitude of the manipulated variable at the time of establishment of the steady state by means of the second control operation performed by the follow-up control means, and when determining the initial value, use this held value to adjust the initial value.

11. A method for controlling the temperature of an object using heat transfer fluid, comprising the steps of:

cooling or heating heat transfer fluid which is supplied to an object (5);

detecting the current temperature of the heat transfer fluid;

detecting the current temperature of the object (5); and inputting the detected current heating medium temperature (T1) and current object temperature (Ts) and thereby controlling the amount by which the heat transfer fluid is cooled or heated, the controlling step comprising the steps of:

determining a fixed target temperature, prior to the application of a thermal load to the object (5) from outside, based on a set temperature (SV) and the temperature difference between the heating medium temperature (T1) and the object temperature (Ts) detected during a steady state, and performing a follow-up control operation such that the current heating medium temperature (T1) is controlled to the determined fixed target temperature; and dynamically determining a current target temperature, when a thermal load is applied to the object (5) from outside, on the basis of the set temperature (SV) and the temperature difference between the current heating medium temperature (T1) and the current object temperature (Ts), and performing a variable value control operation such that the current heating medium temperature (T1) thus determined is controlled to the determined current target temperature.

12. A device for controlling the temperature of an object using heat transfer fluid, comprising:

a cooler/heater (6) for cooling or heating heat transfer fluid which is supplied to an object (5);

a heating medium temperature sensor (10) for detecting the current temperature of the heat transfer fluid;

an object temperature sensor (12) for detecting the current temperature of the object (5);

a controller (9) for outputting a manipulated variable in respect of the cooler/heater (6) by performing a feedback control operation using the current heating medium temperature (T1) from the heating medium temperature sensor and the current object temperature (Ts) from the object temperature sensor;

wherein in the feedback control operation, the controller (9) determines a target temperature of the heating medium temperature (T1) so as to control the object temperature (Ts) to the desired temperature (SV), and determines the manipulated variable so as to control the heating medium temperature (T1) to this determined target temperature; and wherein the controller (9), prior to beginning the feedback control operation, inputs the magnitude of a thermal load to be applied to the object (5) from outside during the feedback control operation and an ON/OFF signal of the thermal load, determines an initial value of the manipulated variable in accordance with the magnitude of the inputted thermal load, and when beginning the feedback control operation, initially outputs the determined initial value.

13. A device for controlling the temperature of an object using heat transfer fluid, comprising:

a cooler/heater (6) for cooling or heating heat transfer fluid which is supplied to an object (5);

a heating medium temperature sensor (10) for detecting the current temperature of the heat transfer fluid;

an object temperature sensor (12) for detecting the current temperature of the object (5);

a controller (9) for outputting a manipulated variable in respect of the cooler/heater (6) by performing a feedback control operation using the current heating medium temperature (T1) from the heating medium temperature sensor and the current object temperature (Ts) from the object temperature sensor;

wherein in the feedback control operation, the controller (9) determines a target temperature of the heating medium temperature (T1) so as to control the object temperature (Ts) to the desired temperature (SV), and determines the manipulated variable so as to control the heating medium temperature (T1) to this determined target temperature;

wherein the controller (9), prior to beginning the feedback control operation, inputs the magnitude of a thermal load to be applied to the object (5) from outside during the feedback control operation and an ON/OFF signal of the thermal load, determines an initial value of the manipulated variable in accordance with the magnitude of the inputted thermal load, and when beginning the feedback control operation, initially outputs the determined initial value; and wherein the controller (9), prior to the beginning of the feedback control operation, holds a value relating to a magnitude of the manipulated variable necessary for stabilizing and maintaining the object temperature (Ts) at the desired temperature (SV) when no thermal load is applied to the object (5) from outside, and when determining the initial value, uses this held value to adjust the initial value.

14. A method for controlling the temperature of an object using heat transfer fluid, comprising the steps of:

cooling or heating heat transfer fluid which is supplied to an object (5);

detecting the current temperature of the heat transfer fluid;

detecting the current temperature of the object (5); and controlling the amount by which the heat transfer fluid is cooled or heated by performing a feedback control operation using the detected current heating medium temperature (T1) and current object temperature (Ts), the controlling step comprising the steps of:

determining a target temperature of the heating medium temperature (T1) so as to control the object temperature (Ts) to a desired temperature (SV); and controlling the amount of heating or cooling so as to control the heating medium temperature (T1) to reach the determined target temperature, prior to beginning the feedback control operation, inputting the magnitude of a thermal load to be applied to the object (5) from outside during the feedback control operation, determining an initial value of the manipulated variable in accordance with the magnitude of the inputted thermal load; and when beginning the feedback control operation, initially outputting the determined initial value.

15. A method for controlling the temperature of an object using heat transfer fluid, comprising the steps of:

cooling or heating heat transfer fluid which is supplied to an object (5);

detecting the current temperature of the heat transfer fluid (5);

detecting the current temperature of the object (5); and controlling the amount by which the heat transfer fluid is cooled or heated by performing a feedback control operation using the detected current heating medium temperature (T1) and current object temperature (Ts), the controlling step comprising the steps of:

determining a target temperature of the heating medium temperature (T1) so as to control the object temperature (Ts) to a desired temperature (SV);

controlling the amount of heating or cooling so as to control the heating medium temperature (T1) to reach the determined target temperature, prior to beginning the feedback control operation, inputting the magnitude of a thermal load to be applied to the object (5) from outside during the feedback control operation, determining an initial value of the manipulated variable in accordance with the magnitude of the inputted thermal load, and when beginning the feedback control operation, initially outputting the determined initial value, and wherein prior to the beginning of the feedback control operation, holding a value relating to a magnitude of the manipulated variable necessary for stabilizing and maintaining the object temperature (Ts) at the desired temperature (SV) when no thermal load is applied to the object (5) from outside, and when determining the initial value, using this held value to adjust the initial value.

* * * * *